United States Patent [19]
Bliss et al.

[11] Patent Number: 5,588,617
[45] Date of Patent: Dec. 31, 1996

[54] MOTOR OPERATED RESTRICTOR VALVE

[75] Inventors: Daniel L. Bliss, Wichita, Kans.; Steven E. Marshall, Renton; Michael I. Ruby, Kirkland, both of Wash.

[73] Assignee: The Boeing Company, Seattle, Wash.

[21] Appl. No.: 373,812

[22] Filed: Jan. 17, 1995

Related U.S. Application Data

[62] Division of Ser. No. 48,028, Apr. 14, 1993, Pat. No. 5,574,101.

[51] Int. Cl.⁶ .................................................. B64D 45/00
[52] U.S. Cl. ........................................ 244/1 N; 244/118.5
[58] Field of Search .................................. 244/118.5, 1 N, 244/1 R, 129.1, 129.2; 137/2, 488, 396, 839.2; 60/39.099, 261, 39.28; 4/10, 77, 79, 216

[56] References Cited

U.S. PATENT DOCUMENTS

| | | |
|---|---|---|
| 2,549,204 | 4/1951 | Kaddatz . |
| 3,036,589 | 5/1962 | Mosier . |
| 3,542,337 | 11/1970 | Scaramucci . |
| 3,542,338 | 11/1970 | Scaramucci . |
| 3,718,158 | 2/1973 | Schon . |
| 4,203,573 | 5/1980 | Boss . |
| 4,674,527 | 6/1987 | Fossati et al. . |
| 4,702,153 | 10/1987 | Grabow ............................ 244/118.5 |
| 5,083,744 | 1/1992 | Reinicke et al. . |
| 5,232,010 | 8/1993 | Rozenblatt et al. . |
| 5,312,072 | 5/1994 | Eklund ............................. 244/129.3 |

FOREIGN PATENT DOCUMENTS

| | | |
|---|---|---|
| 6922573 | 6/1969 | Germany . |
| 63-297874 | 12/1988 | Japan . |

*Primary Examiner*—Galen L. Barefoot
*Attorney, Agent, or Firm*—Conrad O. Gardner

[57] ABSTRACT

A motor operated restrictor valve including a valve assembly for preventing noise at lavatories and galleys of an aircraft while permitting waste water to pass overboard through the drain mast.

2 Claims, 2 Drawing Sheets

MOTOR OPERATED RESTRICTOR VALVE

This application is a Divisional of U.S. patent application Ser. No. 08/048,028 filed Apr. 14, 1993, now U.S. Pat. No. 5,574,101.

BACKGROUND OF THE INVENTION

FIELD OF THE INVENTION

This invention relates generally to motorized valves, and more particularly to a motorized valve for restricting airflow in aircraft drain lines while at the same time accelerating the flow of fluid through the valve to supersonic velocities to thereby reduce audible noise.

DESCRIPTION OF THE PRIOR ART

THE PROBLEM

Noise is generated at airplane lavatory and galley sink inlets, door sill drains, and floor drains due to high airflow through the drain system. Additional noise is introduced into the lavatories and galleys as noise generated at the drain mast propagates up the drain lines. This has resulted in flight line squawks of exceeding desired noise levels. The gray water drain systems in aircraft are then required to be reworked at great cost. It is therefore required to reduce the airflow and noise at airplane lavatory and galley sinks, and further desired to block noise from traveling up the drain lines from the drain mast.

PRIOR ATTEMPTS TO SOLVE THE PROBLEM

Two methods are currently used to reduce lavatory and galley airflow and consequent noise; viz., standpipe (by-pass), mufflers, and diaphragm valves.

Standpipes are simply hoses with mufflers attached to the end. They are installed in a parallel flow path to lavatories and galleys experiencing noise problems. This reduces noise, as some of the air that would be hissing as it entered the sink drain is redirected away from the sink and to the standpipe.

Standpipes are difficult to design analytically. Too many variables are found. This forces the actual configuration and location of standpipes to be a manual operation, requiring hand-tailoring of the drain system after the airplane is completed. This is required for each different configuration. This is a costly operation, and standpipes do nothing to reduce noise propagation from the drain mast. In general, the results of standpipe installations have historically been less than satisfactory.

The second method of addressing this noise problem is diaphragm valves. These are valves located at each sink that close the line to the drain until a certain amount of waste water has accumulated. They then open until the water drains off, and then close again.

Diaphragm valves are prone to clog, as the solids in the waste water settle out when the valve is closed. They also add weight to the airplane, as a diaphragm valve is required at each sink.

The prior art patent literature is illustrative of various types of ball valves; e.g., U.S. Pat. No. 3,542,337 to Scaramicci, issued Nov. 24, 1970, shows spherically-shaped seal surfaces at the inlet and exit of the ball which are hardened to reduce wear caused by the fluid streams at partially closed positions, in contrast to the present hardened surfaces comprising stainless steel inserts attached to Teflon™ seals (a trademark for a synthetic resin polymer).

SUMMARY OF THE INVENTION

This provides a gray water drain valve utilized to allow waste water from sinks, door sill drains, and floor drains to pass overboard through the drain mast. The valve assembly comprises a ball valve, a motor attached to the valve which is spring loaded to the valve open position, and an overpressure valve. The ball valve is shaped to allow full flow when open and sonic flow when driven to the operating position by the motor. The shock wave thus produced blocks drain mast noise from entering the cabin through the drain openings. Stainless steel inserts have been added to the Teflon™ seals in all areas where the seal material would be exposed to accelerated gray water. When system pressure increases due to clogging of the ball valve, the overpressure switch breaks the electrical circuit to the motor, and the valve goes to an open condition to flush out the blockage. Valve reset is automatic when the blockage is cleared.

BRIEF DESCRIPTION OF THE DRAWINGS

FIG. 1 illustrates a typical system utilizing the present restrictor valve 10. A mounting bracket 12 supports restrictor valve 10 in aircraft structure 14, restrictor valve 10 being coupled to control flow between drain hose 16 and drain mast 18. Motor operated restrictor valve 10 includes a motor 27, shown in FIG. 5, having three leads 21, 23, and 25. A pressure sensor 30 opens upon build up of a predetermined head pressure, power then being cut from source 1, 2 applied through close coil across motor 27. Numeral 3 of power source 35 comprises the ground path 25 for the motor 27 control circuit of FIG. 5.

Figure 3:
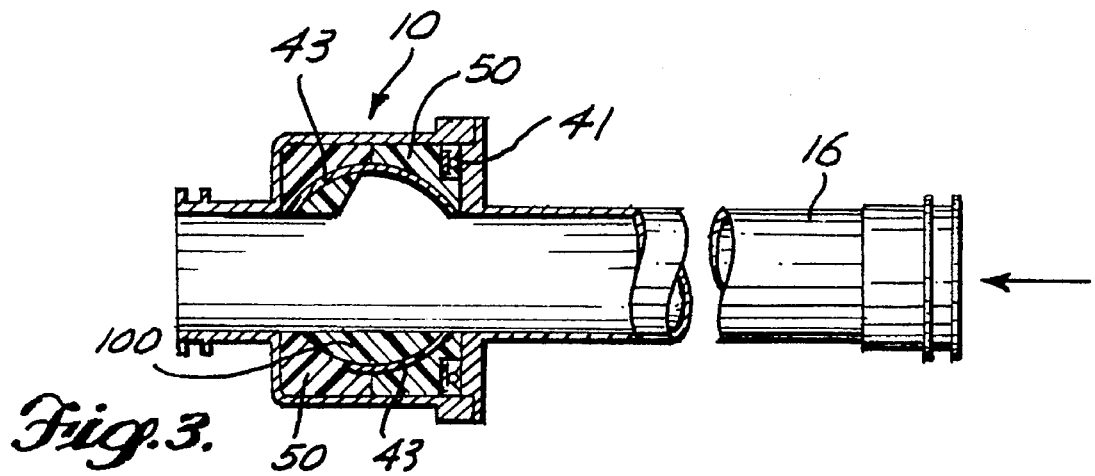
FIG. 3 is a section along the lines 3—3 of the restrictor valve of FIG. 2 taken in the full open (purge) position.
Figure 4:
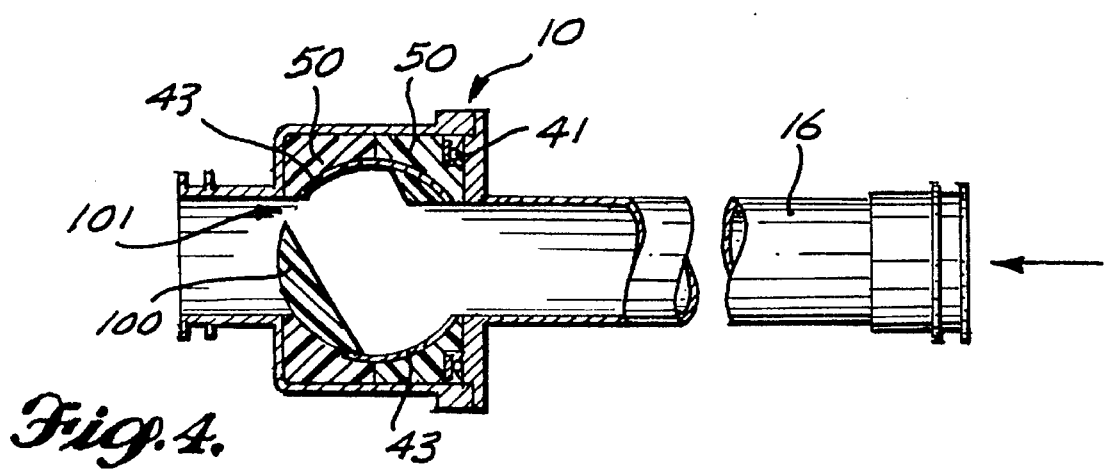
FIG. 4 is a section along the lines 3—3 of the restrictor valve of FIG. 2 taken in the weep position; and, FIG. 5 is a schematic electrical control circuit for the motor operated restrictor valve.
Figure 5:
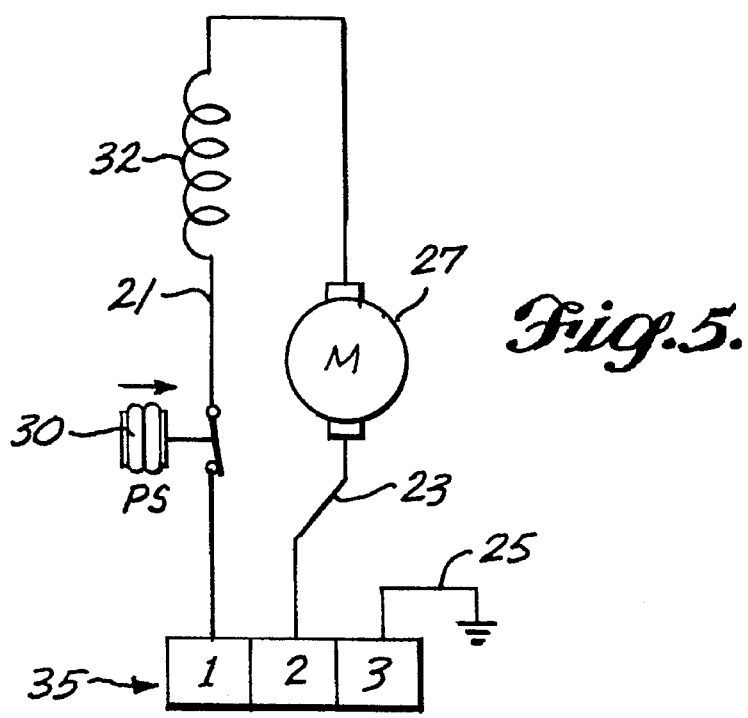

Motor operated restrictor valve 10 is spring biased through spring assembly 41 into normally open position, as shown in FIG. 3, to drain the line when motor 27 is deenergized, and driven to a nearly closed or weep position, as seen in FIG. 4, when motor 27 is energized. The head (pressure responsive) switch 30 is series coupled with motor 27 to power source 35 and de-energizes motor 27 by opening the motor control circuit of FIG. 5. Hardened seals 43 for valve ball 100, including stainless steel inserts in the valve Teflon™, are utilized to reduce seal erosion. Further seals 50 are shown in FIG. 5, the nozzle outlet 101 also shown.

The present restrictor valve 10 is a motorized valve which restricts airflow in the drain lines, while at the same time accelerating the fluid traveling through the valve nozzle to supersonic velocities. The reduction of airflow at the valve is reflected by lower flow at each sink drain. The supersonic blast emitting from the valve causes an acoustic block to noise generated downstream of the device. Turbulent mixing noise produced at the drain mast is effectively blocked from propagating upstream of the valve. System flow is reduced to acceptable levels, and the velocity through the valve body reaches the desired supersonic levels.

The high velocity of gray water through the valve body necessitates the need for hardened seals 43 to eliminate seal erosion. This has been accommodated by including stainless steel inserts in the Teflon™ seals in all areas where the seal material would be exposed to accelerated gray water.

The present system includes a self-cleaning mechanism. When clogs form in the drain lines, a pressure switch 30 integral to restrictor valve 10 senses the clog. The valve automatically clears the clog by electrically cycling the valve from its normal restrictor/accelerator position of FIG. 4 to a full open position, as shown in FIG. 5. This blows out the valve. At the same time, the motion scrubs the valve seals. The ability of the valve to function with severe solid solutions, as well as its ability to purge clogs, has been successfully demonstrated.

Figure 1:
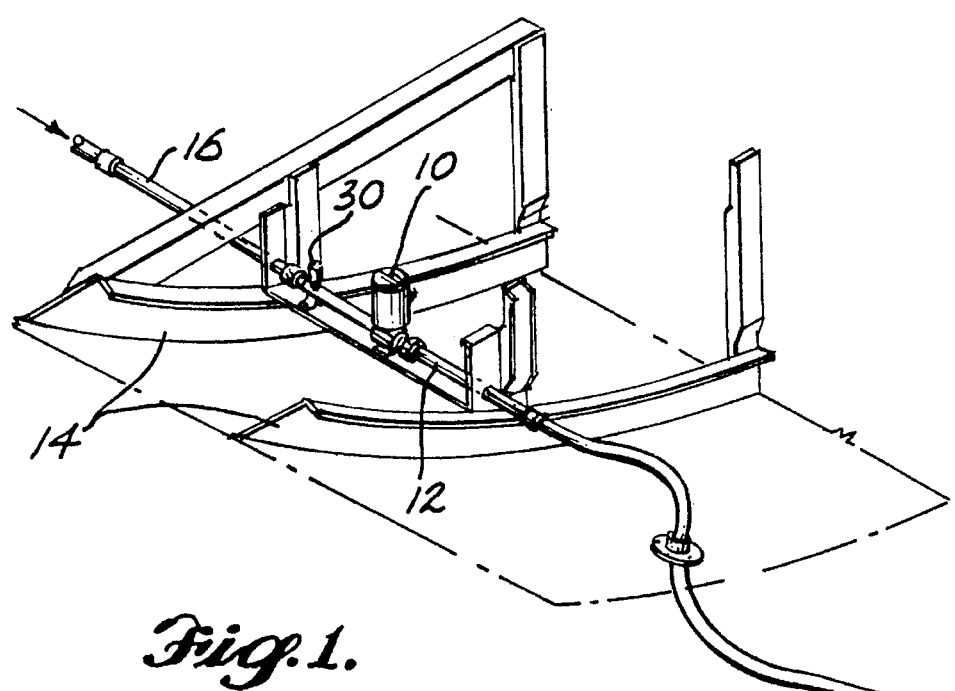
FIG. 1 is a system schematic diagram showing the restrictor valve in accordance with the preferred embodiment of the invention installed between drain hose and drain mast of an aircraft.
Figure 2:
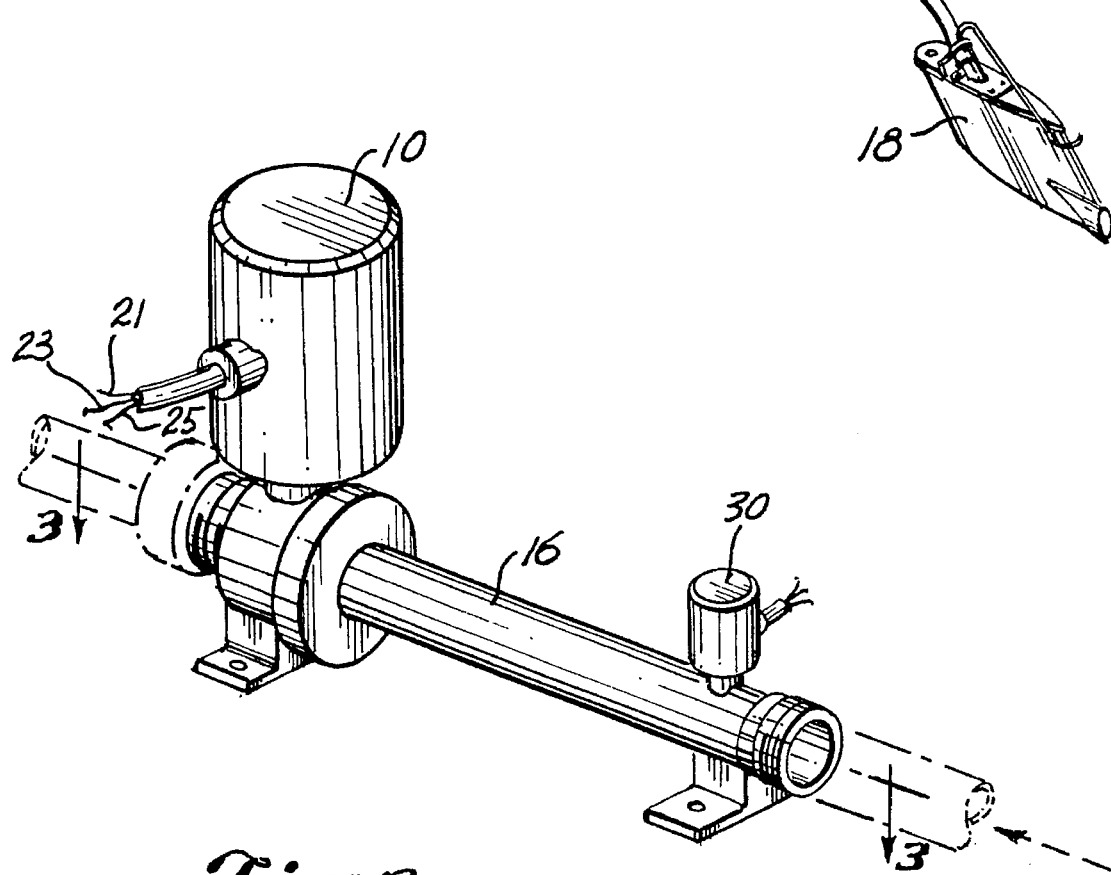
FIG. 2 is a perspective view of the restrictor valve in accordance with the preferred embodiment of the invention.

Pressure sensor 30 which cycles valve 10 in the event of a clog is located on a short length of tube attached to the inlet to the ball assembly, as shown in FIG. 2. This sensor actuates the valve when the head pressure from water build-up upstream of the valve reaches a predetermined height. The exact height of head required to cycle the valve will be within 2 to 4 feet of total head.

A fail-safe mechanism (not shown) may be included in the valve. In the advent of a power failure, or a failure in the valve itself, the valve will actuate to its full open position. Though this eliminates any acoustic advantage, it does allow full operation of the lavatories and galleys. The fail-safe is engaged whenever the airplane lands. Power is coupled to the landing gear squat switch. When the airplane is on the ground, power is cut to the restrictor and cycles it open.

The valve may be heated to preclude freezing of standing gray water which would collect prior to the valve cycling and clearing a clog. This heating may be accomplished by the continuation of the drain line strip heaters and insulating foam wrap.

On landing, power is removed from the valve so it may cycle to a fully open position, thereby providing for drain lines servicing without restriction. This methodology also cleans the valve seals by a wiper in the ball. This self-cleaning feature may therefore yield further advantages.

What is claimed is:

1. A method for preventing noise from entering the cabin of an aircraft through drain openings comprising the steps of inserting a motor operated restrictor valve between a drain hose and a drain mast;

spring loading said restrictor valve to an open position to provide full flow of fluid between said drain hose and said drain mast; and then applying power to said motor operated restrictor valve, thereby producing a shock wave to block noise from entering the cabin.

2. The method, according to claim 1, wherein said step of applying power to said motor operated restrictor valve comprises applying power when pressure is between 2 and 4 feet of total head.

* * * * *